United States Patent
Bald et al.

(10) Patent No.: US 9,709,462 B2
(45) Date of Patent: Jul. 18, 2017

(54) METHOD FOR DETECTING A DEVIATION OF A COMPRESSION PRESSURE OF ONE CYLINDER FROM THAT OF ANOTHER CYLINDER OF AN INTERNAL COMBUSTION ENGINE

(71) Applicant: Robert Bosch GmbH, Stuttgart (DE)

(72) Inventors: Christian Bald, Vaihingen (DE); Andrea Matteucci, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 14/536,059

(22) Filed: Nov. 7, 2014

(65) Prior Publication Data
US 2015/0128688 A1 May 14, 2015

(30) Foreign Application Priority Data
Nov. 8, 2013 (DE) .......................... 10 2013 222 711

(51) Int. Cl.
| | |
|---|---|
| G01M 15/08 | (2006.01) |
| F02D 41/22 | (2006.01) |
| F02D 41/28 | (2006.01) |
| F02D 35/02 | (2006.01) |
| F02D 41/06 | (2006.01) |
| F02D 41/12 | (2006.01) |

(52) U.S. Cl.
CPC .............. *G01M 15/08* (2013.01); *F02D 41/22* (2013.01); *F02D 35/024* (2013.01); *F02D 41/062* (2013.01); *F02D 41/123* (2013.01); *F02D 2041/288* (2013.01); *Y02T 10/40* (2013.01)

(58) Field of Classification Search
CPC .... F02D 35/023; F02D 35/024; F02D 41/123; F02D 41/22; G01M 15/08; Y02T 10/44
USPC .......................................... 73/114.16, 114.22
See application file for complete search history.

(56) References Cited

U.S. PATENT DOCUMENTS

| | | | | |
|---|---|---|---|---|
| 4,562,728 A | * | 1/1986 | Timmerman | ....... G01M 15/046 701/101 |
| 4,606,224 A | * | 8/1986 | Tedeschi | ............. G01M 15/046 73/114.22 |
| 4,967,711 A | * | 11/1990 | Morikawa | ............. F02D 35/023 123/478 |
| 5,168,854 A | * | 12/1992 | Hashimoto | ........... F02D 35/023 123/406.17 |
| 7,162,916 B2 | * | 1/2007 | Zavarehi | ............. F02D 41/1498 73/114.13 |

(Continued)

*Primary Examiner* — Daniel S Larkin
*Assistant Examiner* — Anthony W Megna Fuentes
(74) *Attorney, Agent, or Firm* — Norton Rose Fulbright US LLP; Gerard Messina

(57) ABSTRACT

In a method for detecting a deviation of a compression pressure of one cylinder from that of another cylinder of an internal combustion engine having at least two cylinders, the rotational speed of a crankshaft of the internal combustion engine is reduced from a starting rotational speed to a target rotational speed; the actual rotational speed is detected; a curve of a change of the actual rotational speed per angle unit of the crankshaft is determined as a curve of a rotational speed gradient; the curve of the rotational speed gradient is subjected to order analysis; and a deviation of the compression pressure of one cylinder from that of another cylinder is detected when an amplitude of a selected order lies above a permissible threshold value.

7 Claims, 4 Drawing Sheets

(56) References Cited

U.S. PATENT DOCUMENTS

| | | | | |
|---|---|---|---|---|
| 8,620,564 B2* | 12/2013 | Hakariya | ............ | F02D 41/0085 |
| | | | | 123/673 |
| 2005/0150282 A1* | 7/2005 | Andreasen | ............ | G01L 19/083 |
| | | | | 73/114.18 |
| 2009/0301435 A1* | 12/2009 | Weissenborn | ........ | F02D 35/023 |
| | | | | 123/435 |
| 2010/0138135 A1* | 6/2010 | Hacker | ............... | F02D 41/0085 |
| | | | | 701/102 |
| 2013/0298874 A1* | 11/2013 | Sun | ........................ | F02B 71/00 |
| | | | | 123/46 A |

\* cited by examiner

METHOD FOR DETECTING A DEVIATION OF A COMPRESSION PRESSURE OF ONE CYLINDER FROM THAT OF ANOTHER CYLINDER OF AN INTERNAL COMBUSTION ENGINE

BACKGROUND OF THE INVENTION

1. Field of the Invention

The present invention relates to a method for detecting a deviation of a compression pressure of one cylinder from that of another cylinder of an internal combustion engine, and to a processing unit for carrying out the method.

2. Description of the Related Art

Fuel injection systems facilitate the metering of the fuel required for a combustion in an internal combustion engine, with the aid of one or multiple injectors (also referred to as fuel injectors or injector nozzles). In the case of direct gasoline injection or common-rail injection, the fuel is injected directly into the combustion chamber. The metered fuel quantity is of crucial importance in terms of quality of combustion and, therefore, the consumption and exhaust behavior of the internal combustion engine.

However, the metered fuel quantity is affected by properties of the injector itself. Due to manufacturing tolerances and wear, which may occur in the injectors employed within an internal combustion engine, the fuel quantity (i.e., quantity of fuel injected) metered by the injectors may vary.

With the aid of a run-up test, it is possible to easily check without disassembly the quantity deviation of the installed injectors of an internal combustion engine, even in a motor vehicle in the end customer's possession. The particular conditions in the workshop environment allow for modified operating modes as well as permanently defined, stable operating points. This is frequently not possible during driving operation, since the control of the internal combustion engine must implement the driver's input. Different injection quantities may be detected during the run-up test of the internal combustion engine by accelerating the internal combustion engine for a fixed period of time (so-called run-up), starting from a specific starting rotational speed by setting a defined setpoint injection quantity for all injectors but one. In this test, accuracy functions, balance functions and correction functions are suppressed, if necessary, using values learned from the past, in order to detect the actual state as clearly as possible. The target rotational speed achieved is then measured. The injector not actuated is then continuously varied. If the target rotational speeds differ, or if a target rotational speed deviates significantly from the average of the other target rotational speeds, then a deviation of the actual injection quantity from the setpoint injection quantity may be inferred, if the remaining parameters, which affect the torque, in this case in particular the compression pressure (pressure inside a cylinder which is generated by the piston stroke), are the same for all cylinders.

It is desirable, therefore, to be able to check in a simple manner whether the compression pressure, as a definitive parameter affecting the torque, is the same for all cylinders.

BRIEF SUMMARY OF THE INVENTION

According to the present invention, a method is provided for detecting a deviation of a compression pressure of one cylinder from that of another cylinder of an internal combustion engine, and a processing unit for carrying out the method.

Within the scope of the present invention, a method is presented with which a deviation of a compression pressure of one cylinder from that of another cylinder of an internal combustion engine having at least two cylinders may be easily detected during a coasting process from a starting rotational speed to a target rotational speed (for example, idling rotational speed). For this purpose, the change of the actual rotational speed per angle unit of the crankshaft (i.e., the rotational speed gradient) is ascertained. The curve of the rotational speed gradient is subject to order analysis.

A deviation of a compression pressure of one cylinder from that of another cylinder will result in an oscillation, which has a frequency lower than the ignition frequency (number of ignition events per angle unit). The order analysis is based, in particular, not on a temporal but rather on an angle-synchronous (° KW) plotting of the rotational speed gradient. Preferably, orders $O=k/N$ are evaluated with $k=1, \ldots, N$ and N=number of cylinders. In the absence of any compression pressure errors, none of these orders will be particularly pronounced. The order $O=1$ corresponds to the ignition frequency (in a four cylinder engine 4/720° KW). By comparing the orders O not equal to 1 (in particular ($O<1$) with a permissible threshold value, it is thus possible to easily detect a compression error.

Ideally, i.e. with no cylinder compression disruptions, the compression pressure is the same for each cylinder and generates a periodic variation synchronously with the TDC of each cylinder. Since during the compression phase the required power before the top dead center (power output for compressing the gas within the cylinder) is positive, the speed of the crankshaft is more greatly reduced than in the following phase (i.e., expansion). In the event of poor compression, the power required to compress the gas in the cylinder is less and, as a consequence, the rotational speed gradient is smaller and oscillation increases. This will result, in particular, in a marked appearance of the order $O=¼$ (i.e., the amplitude of the order $O=¼$ lies above a permissible threshold value).

Which of the cylinders is faulty may be detected preferably by analyzing a curve of the rotational speed gradient. In particular, a comparison of the curve of the rotational speed gradient is carried out with a standard interval. If all cylinders are equally closed, the rotational speed gradient will move within the standard interval. If at a point in time the rotational speed gradient lies outside the standard interval, then a compression error is present in one of the cylinders, in particular in the one cylinder which is in the power stroke at the point in time the rotational speed gradient lies outside the standard interval.

The advantage of the present invention is a rapid identification of poor compression with no significant modifications to the instantaneous design of run-up tests.

During the coasting process, the internal combustion engine is advantageously unfired and injections are stopped. Thus, the rotational speed gradient is influenced solely by gas exchange processes.

The starting rotational speed may be started up, for example, by powering the internal combustion engine with an electric machine, in particular a starter, or by firing the internal combustion engine. To enable reliable predictions, the starting rotational speed should not be selected to be too low. The starting rotational speed may amount to approximately 80% of a maximum achievable rotational speed, or it may lie in the range of the rotational speed having the highest power output.

The present invention is suitable, in particular, for testing gasoline combustion engines or diesel combustion engines of passenger vehicles or trucks and commercial vehicles, both on a test bench and when implemented using control devices when in operation.

A processing unit according to the present invention, for example a control unit of a motor vehicle or an internal combustion engine is, in particular, programmed to carry out a method according to the present invention.

The implementation of the method in the form of software is also advantageous, since this involves particularly low costs, in particular if a performing control unit is also used for other tasks and is therefore present anyway. Suitable data media for providing the computer program are, in particular, diskettes, hard disks, flash memories, EEPROMs, CD-ROMs, DVDs and the like. It is also possible to download a program from computer networks (Internet, Intranet, etc.).

Additional advantages and embodiments of the present invention result from the description and the appended drawing.

It is understood that the features cited above and those to be explained below are applicable not only in each specified combination, but also in other combinations or alone, without departing from the scope of the present invention.

The present invention is schematically shown in the drawing with reference to exemplary embodiments and is explained in greater detail below with reference to the drawing.

DETAILED DESCRIPTION OF THE INVENTION

Figure 1:
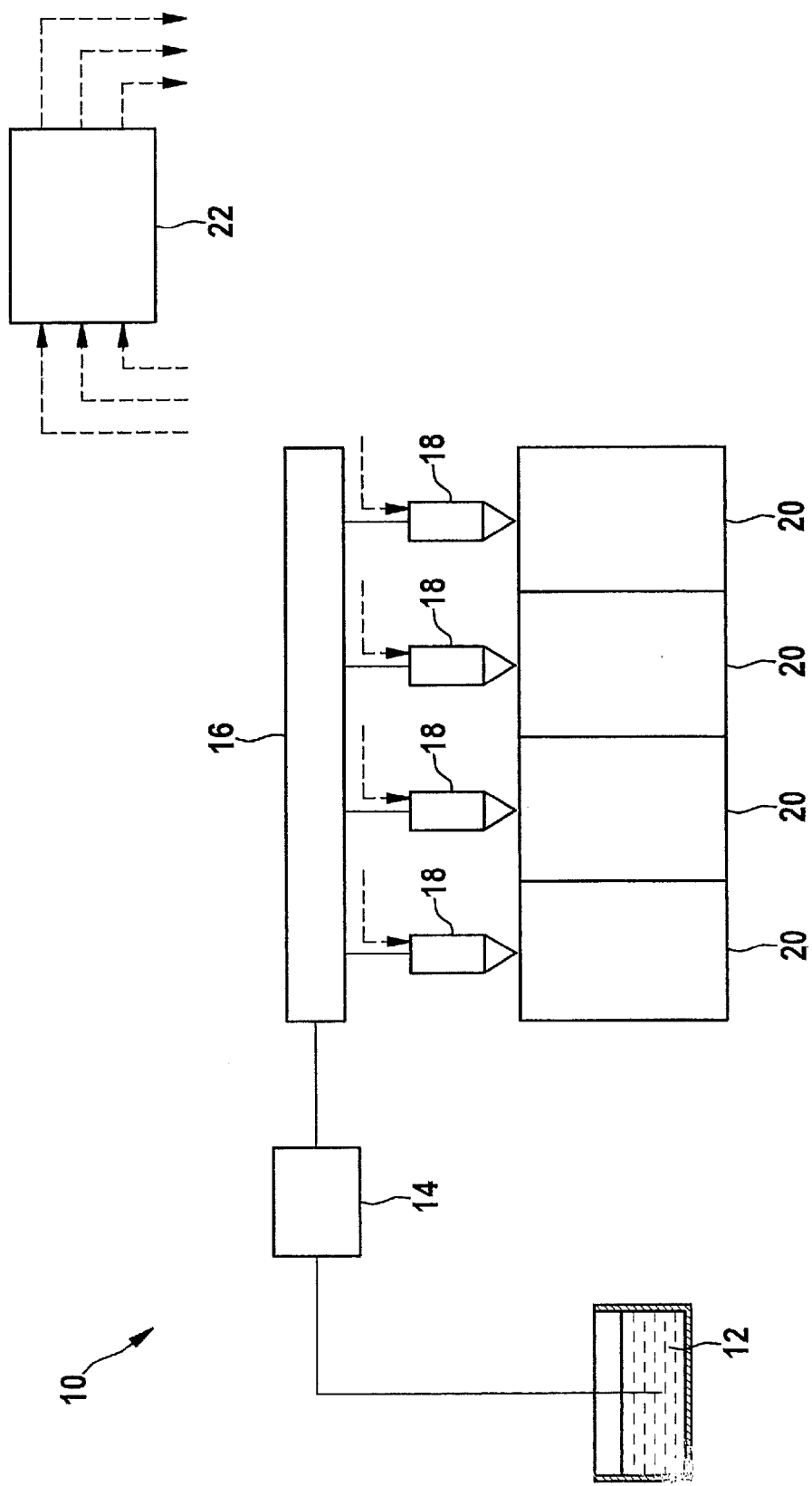
FIG. 1 shows a heavily schematized representation of an internal combustion engine including a fuel injection system and a plurality of injectors.

FIG. 1 schematically shows a detail of an internal combustion engine 10, which includes a fuel reservoir 12, from which fuel is conveyed into a high pressure fuel line 16 with the aid of a delivery system 14. High pressure fuel line 16 is designed, for example, as a common-rail. High pressure fuel line 16 is connected to injectors 18, which enable the fuel to be injected directly into injectors 18 of respectively associated combustion chambers of cylinders 20. The operation of internal combustion engine 10 and, in particular, the fuel injection system which, in the present case, includes delivery system 14, high pressure fuel line 16 and injectors 18, is controlled by a processing unit, in this case a control unit 22. Control unit 22 makes it possible to detect input values, for example, the instantaneous rotational speed, and to provide output values or to control actuators, in particular to control injectors 18.

Figure 2:
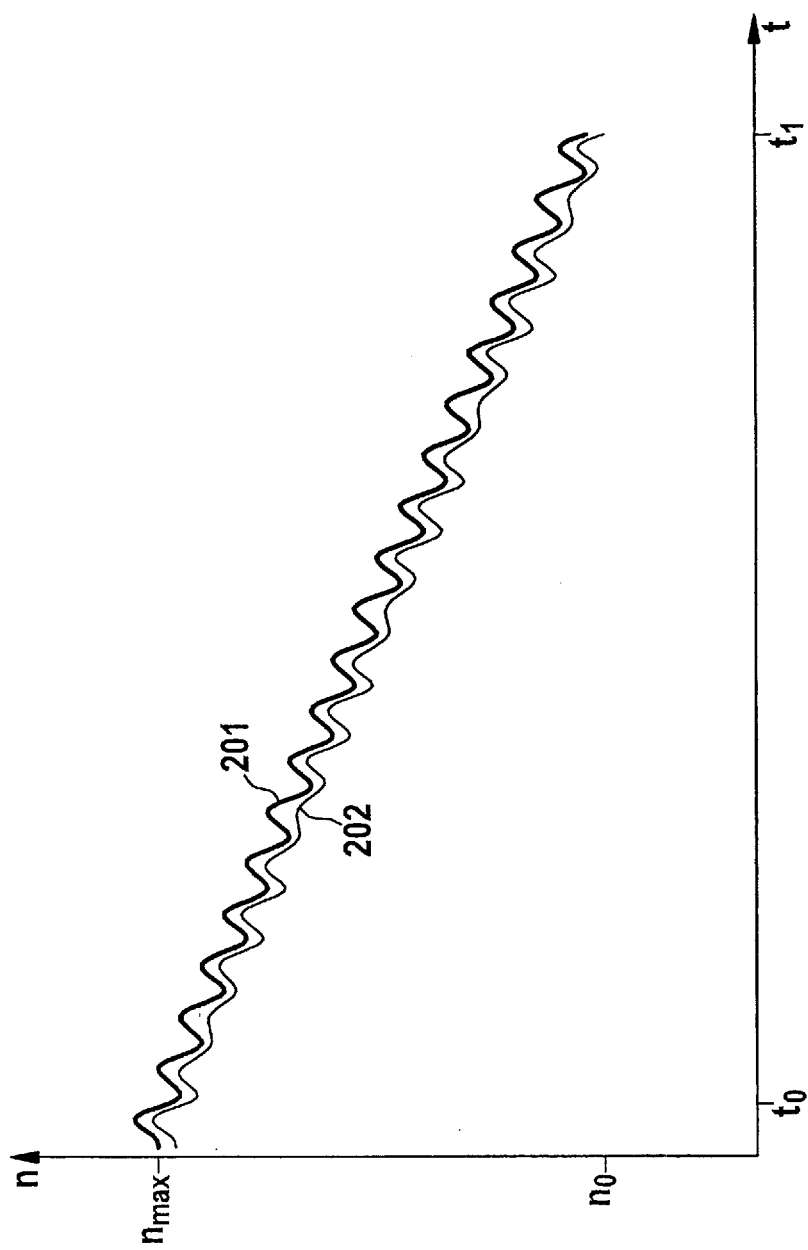
FIG. 2 shows rotational speed curves during a coasting process for a case involving fault-free cylinders and a case involving one faulty cylinder.

Plotted in FIG. 2 are two rotational speed curves 201, 202 against time t or, alternatively, the number of crankshaft rotations, during a coasting process.

The coasting test starts at a point in time $t_0$, at which the internal combustion engine or its crankshaft rotates at a starting rotational speed $n_{max}$. The starting rotational speed is advantageously at approximately 80% or more of a permissible maximum rotational speed. At a point in time $t_0$, injections are stopped and throttle valves or the like are opened. Hence, the reduction in rotational speed is influenced essentially by gas exchange processes, since it may be assumed that friction and the like is the same for all cylinders. At a point in time $t_1$, the coasting test is ended, advantageously because an idle rotation speed $n_0$ is reached (or because a predefined period of time has lapsed). To prevent it from stalling, the internal combustion engine may be switched back to fired operation.

Rotational speed curve 201 corresponds to a case involving fault-free cylinders. An oscillation of the engine speed signal is noticeable. The oscillation is brought about by a deceleration caused by a compression until the TDC is reached, and by an acceleration caused by an expansion after the TDC. The rotational speed gradient curve obtained from rotational speed curve 201 is shown in FIG. 3 and identified with reference numeral 301.

Rotational speed curve 202 corresponds to a case involving a faulty cylinder. A base oscillation of the engine speed signal is noticeable, which is overlaid by another oscillation. The oscillation is brought about by a reduced deceleration caused by a disrupted compression until the TDC is reached, and by a reduced acceleration caused by an (also disrupted) expansion after the TDC. Accordingly, the amplitude of the base oscillation is always reduced as compared to the remaining times, when the faulty cylinder is compressed and expanded (i.e., compression stroke and power stroke). The rotational speed gradient obtained from rotational speed curve 202 is shown in FIG. 3 and identified with reference numeral 302.

Figure 3:
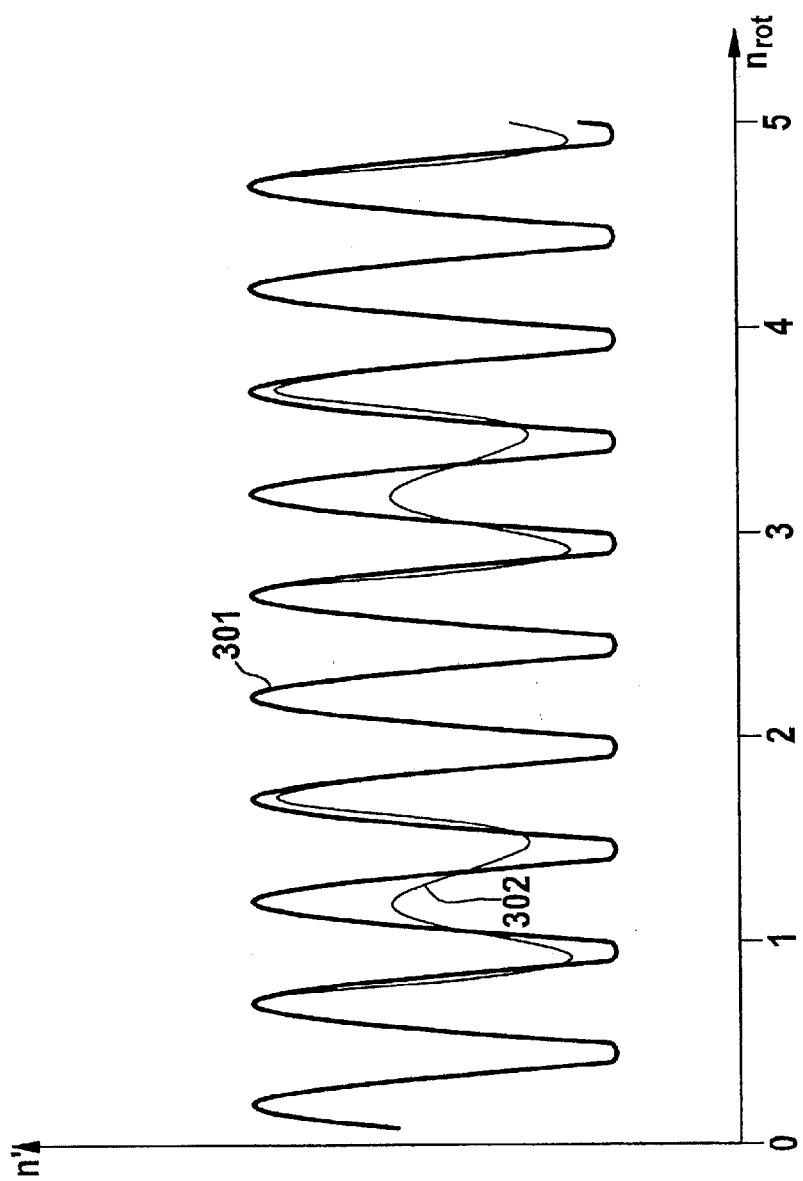
FIG. 3 shows a curve of the rotational speed gradient during a coasting process for the cases from FIG. 2.

Plotted in FIG. 3, as mentioned, are rotational speed gradient curves n' against number $n_{rot}$ of crankshaft rotations.

It is apparent that in the fault-free case, rotational speed gradient curve 301 has essentially just one frequency. In particular, two periods per rotation are visible, so that the frequency corresponds to the ignition frequency. Accordingly, with respect to the ignition frequency, rotational speed gradient curve 301 has order O=1.

In the faulty case on the other hand, it is apparent that in addition to the ignition frequency, rotational speed gradient curve 302 has still another frequency. In particular, the amplitude of the oscillation is reduced at each fourth ignition frequency. Accordingly, with respect to the ignition frequency, rotational speed gradient curve 302 has orders O=1 and O=¼.

In the specific embodiment shown, the rotational speed gradient is assessed. In addition, the curve of rotational speed gradient 302 is subject to order analysis during the coasting process, in order to ascertain oscillation orders. Order 1 corresponds to the ignition frequency in the fault-free case, i.e., when the compression pressure of all cylinders is the same. Thus, a fault may be detected when, in addition to order O=1 (corresponds to the ignition frequency, in a 4-cylinder engine, for example, half of a KW [crank shaft] rotation) significantly smaller orders also occur (i.e., greater than a permissible threshold value) in a 4-cylinder engine, in particular order O=¼.

Figure 4:
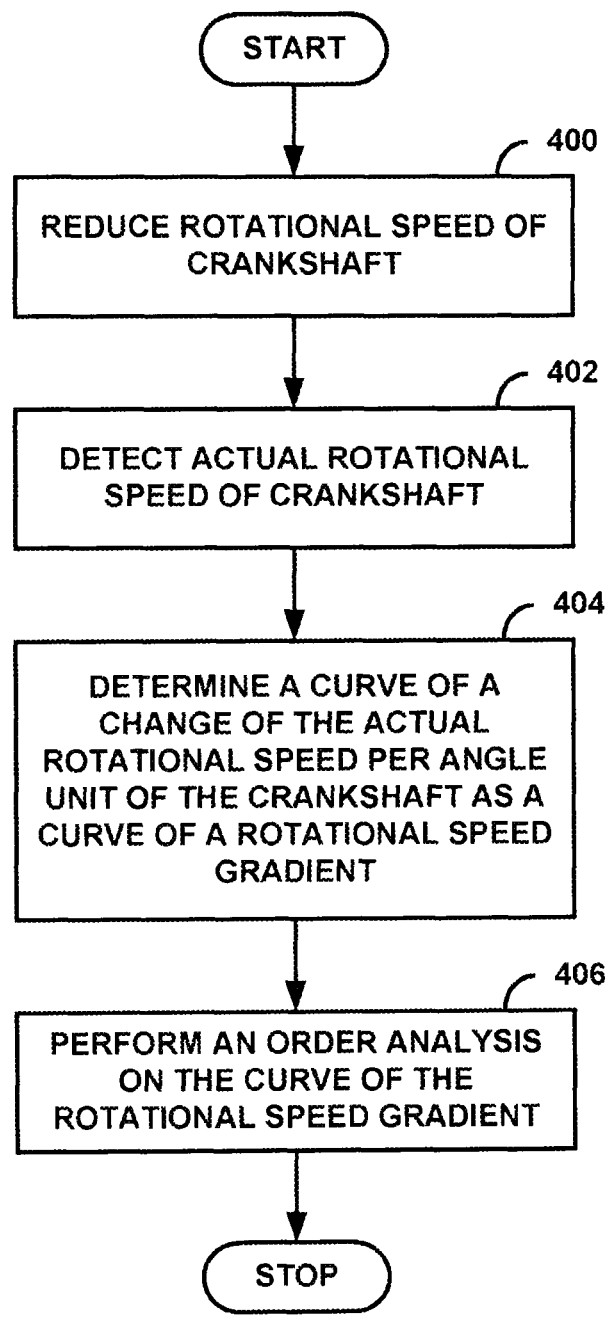
FIG. 4 shows a flow diagram illustrating a method for detecting a deviation of a compression pressure of a first cylinder from a compression pressure of a second cylinder of an internal combustion engine.

Turning to FIG. 4, a method for detecting a deviation of a compression pressure of a first cylinder from a compression pressure of a second cylinder of an internal combustion engine includes reducing a rotational speed of a crankshaft of the internal combustion engine from a starting rotational speed to a target rotational speed at block 400. At block 402, the method includes detecting an actual rotational speed of the crankshaft. At block 404, the method includes determining a curve of a change of the actual rotational speed per angle unit of the crankshaft as a curve of a rotational speed gradient. At block 406, the method includes performing an order analysis on the curve of the rotational speed gradient, wherein a deviation of the compression pressure of the first cylinder from the compression pressure of the second cylinder is detected when an amplitude of a selected order lies above a permissible threshold value.

What is claimed is:

1. A method for detecting a deviation of a compression pressure of a first cylinder from a compression pressure of a second cylinder of an internal combustion engine, comprising:
   reducing a rotational speed of a crankshaft of the internal combustion engine from a starting rotational speed to a target rotational speed;
   detecting an actual rotational speed of the crankshaft;
   determining a curve of a change of the actual rotational speed per angle unit of the crankshaft as a curve of a rotational speed gradient; and
   performing an order analysis on the curve of the rotational speed gradient, wherein a deviation of the compression pressure of the first cylinder from the compression pressure of the second cylinder is detected when an amplitude of a selected order lies above a permissible threshold value.

2. The method as recited in claim 1, wherein the selected order is ascertained as a function of the number of cylinders of the internal combustion engine.

3. The method as recited in claim 2, wherein the order is a fraction k/N of a base order, which corresponds to an ignition frequency, N being the number of cylinders of the internal combustion engine and k=1, . . . , N−1.

4. The method as recited in claim 3, wherein the first and second cylinders are not fired.

5. The method as recited in claim 3, wherein the rotational speed gradient is compared to a standard interval, and wherein the first cylinder, whose compression pressure deviates from the compression pressure of the second cylinder, is ascertained with reference to a point in time at which the rotational speed gradient lies outside the standard interval.

6. A device for detecting a deviation of a compression pressure of a first cylinder from a compression pressure of a second cylinder of an internal combustion engine, comprising:
   a control unit including a processor configured to perform the following:
      reducing a rotational speed of a crankshaft of the internal combustion engine from a starting rotational speed to a target rotational speed;
      detecting an actual rotational speed of the crankshaft;
      determining a curve of a change of the actual rotational speed per angle unit of the crankshaft as a curve of a rotational speed gradient; and
      performing an order analysis on the curve of the rotational speed gradient, wherein a deviation of the compression pressure of the first cylinder from the compression pressure of the second cylinder is detected when an amplitude of a selected order lies above a permissible threshold value.

7. A non-transitory computer-readable data storage medium storing a computer program having program codes which, when executed on a computer, performs a method for detecting a deviation of a compression pressure of a first cylinder from a compression pressure of a second cylinder of an internal combustion engine, the method comprising:
   reducing a rotational speed of a crankshaft of the internal combustion engine from a starting rotational speed to a target rotational speed;
   detecting an actual rotational speed of the crankshaft;
   determining a curve of a change of the actual rotational speed per angle unit of the crankshaft as a curve of a rotational speed gradient; and
   performing an order analysis on the curve of the rotational speed gradient, wherein a deviation of the compression pressure of the first cylinder from the compression pressure of the second cylinder is detected when an amplitude of a selected order lies above a permissible threshold value.

* * * * *